(12) United States Patent
Sanson et al.

(10) Patent No.: US 12,717,025 B2
(45) Date of Patent: Aug. 25, 2026

(54) SYSTEMS AND METHODS FOR INCREASING RADAR RESOLUTION USING SEMI-COHERENT RADAR NETWORKS

(71) Applicant: GM Cruise Holdings LLC, San Francisco, CA (US)

(72) Inventors: Jessica Bartholdy Sanson, Munich (DE); Kalin Hristov Kabakchiev, Munich (DE); Andreas Barthelme, Gars (DE); Johanna Gütlein-Holzer, Munich (DE); Andre Giere, Oberpframmern (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 318 days.

(21) Appl. No.: 18/468,670

(22) Filed: Sep. 15, 2023

(65) Prior Publication Data

US 2025/0052895 A1 Feb. 13, 2025

(30) Foreign Application Priority Data

Aug. 11, 2023 (EP) .................................... 23191019

(51) Int. Cl.
*G01S 13/931* (2020.01)
*G01S 13/42* (2006.01)

(52) U.S. Cl.
CPC .......... *G01S 13/931* (2013.01); *G01S 13/424* (2013.01); *G01S 2013/93271* (2020.01)

(58) Field of Classification Search
CPC ................. G01S 13/931; G01S 13/424; G01S 2013/93271; G01S 13/42; G01S 13/584; G01S 13/878

(Continued)

(56) References Cited

U.S. PATENT DOCUMENTS 1,150,904 A * 8/1915 Tappan .................. F24B 5/087 126/1 AC
6,545,633 B1 * 4/2003 Jensen .................. G01S 13/003 342/134

(Continued)

FOREIGN PATENT DOCUMENTS

DE 102020123293 A1 * 3/2022 ............. G01S 13/87
EP 2527871 A1 * 11/2012 ............. G01S 13/89

(Continued)

*Primary Examiner* — Nuzhat Pervin
(74) *Attorney, Agent, or Firm* — CANTOR COLBURN LLP

(57) ABSTRACT

Various technologies described herein pertain to systems and methods for increasing radar resolution by, for example, combining radar information. In one embodiment, beamforming is performed using radar units that are individually coherent but collectively do not need to be coherent. Each radar transmits and receives its own signal to process and generate target information including beamforming information and/or virtual receiver channel information. The target information from each radar is then merged or summed into a combined beamforming based on all the target information received from all the radar units. When the radar units used in this manner are separated by a distance, the resulting beamforming information is representative of an aperture/resolution based on the total space or distance between the radar units. Thus, having an improved resolution, benefits such as improved target resolution (e.g., size, position, and detection) can be achieved.

20 Claims, 8 Drawing Sheets

(58) Field of Classification Search
USPC .............................................................. 342/70
See application file for complete search history.

(56) References Cited

U.S. PATENT DOCUMENTS

| | | | | |
|---|---|---|---|---|
| 10,288,720 | B1 * | 5/2019 | Adolf | G01S 13/87 |
| 11,243,304 | B2 * | 2/2022 | Hong | G01S 13/003 |
| 11,520,030 | B2 * | 12/2022 | Wu | G01S 7/288 |
| 11,639,983 | B2 * | 5/2023 | Roger | G01S 13/343 342/112 |
| 11,686,841 | B2 * | 6/2023 | Wang | G01S 13/04 342/59 |
| 11,860,267 | B2 * | 1/2024 | Hong | G01S 13/003 |
| 11,888,554 | B2 * | 1/2024 | Wu | H04B 7/043 |
| 12,078,751 | B2 * | 9/2024 | Yoffe | G01S 13/881 |
| 12,282,085 | B2 * | 4/2025 | Zhu | G01S 13/872 |
| 2013/0106642 | A1 * | 5/2013 | Tomich | G01S 13/003 342/22 |
| 2016/0047907 | A1 * | 2/2016 | Izadian | H01Q 3/2605 342/368 |
| 2017/0248688 | A1 * | 8/2017 | Campbell | G01S 7/4026 |
| 2017/0315221 | A1 * | 11/2017 | Cohen | G01S 13/42 |
| 2018/0113210 | A1 * | 4/2018 | Izadian | G01S 13/90 |
| 2020/0191911 | A1 * | 6/2020 | Meissner | G01S 13/343 |
| 2020/0300965 | A1 * | 9/2020 | Wu | G01S 7/42 |
| 2020/0300995 | A1 * | 9/2020 | Wu | G01S 13/003 |
| 2020/0301002 | A1 * | 9/2020 | Wu | G01S 13/4454 |
| 2020/0371229 | A1 * | 11/2020 | Levitan | G01S 7/285 |
| 2021/0063566 | A1 * | 3/2021 | Smith | G06V 20/58 |
| 2021/0080568 | A1 * | 3/2021 | Brown | G01S 13/87 |
| 2021/0096214 | A1 * | 4/2021 | Campbell | G01S 7/40 |
| 2021/0181302 | A1 * | 6/2021 | Duncklee | G01S 7/40 |
| 2022/0094397 | A1 * | 3/2022 | Wu | H04B 7/0617 |
| 2022/0099817 | A1 * | 3/2022 | Crouch | G01S 13/426 |
| 2022/0187417 | A1 * | 6/2022 | Wu | G01S 7/42 |
| 2022/0308160 | A1 * | 9/2022 | Dent | G01S 7/025 |
| 2023/0023302 | A1 * | 1/2023 | Roudiere | G01S 7/023 |
| 2023/0406375 | A1 * | 12/2023 | Lindqvist | B61K 9/12 |
| 2025/0258271 | A1 * | 8/2025 | Chen | G01S 13/931 |

FOREIGN PATENT DOCUMENTS

| | | | | |
|---|---|---|---|---|
| EP | 3392669 | A1 * | 10/2018 | G01S 7/40 |
| EP | 3418768 | A1 * | 12/2018 | G01S 13/003 |
| EP | 3471210 | A1 * | 4/2019 | G01S 13/003 |
| EP | 3712653 | A1 * | 9/2020 | G01S 7/42 |

* cited by examiner

SYSTEMS AND METHODS FOR INCREASING RADAR RESOLUTION USING SEMI-COHERENT RADAR NETWORKS

RELATED APPLICATION

This application claims priority to European Patent Application No. 23191019.1, filed on Aug. 11, 2023, and entitled "SYSTEMS AND METHODS FOR INCREASING RADAR RESOLUTION USING SEMI-COHERENT RADAR NETWORKS". The entirety of this application is incorporated herein by reference.

BACKGROUND

Radar has been used to assist various vehicle functions such as, for example, collision avoidance, cruise or flight control, and the positioning and movement of objects. Radar works by emitting high-frequency radio waves and measuring the reflection, or echo, of the waves from nearby objects. The time delay between the transmission and reception of the waves is used to determine the distance, speed, and direction of the object(s). This information can be processed by radar unit(s) and/or the vehicle's onboard computer(s) to provide real-time information to enhance vehicle navigation and safety.

Vehicles such as, for example, automobiles, drones, etc., place constraints on radar system design due to the vehicle's limited size and available space for radar units. For example, the front end of an automobile typically requires space for headlights, turn signals, grills for cooling air flow, dams and deflectors for aerodynamics, etc. All these elements constrain the available space for radar units and thus place constraints on increasing a radar system's aperture and/or resolution.

Also, use of a network of multiple radar units to increase aperture and/or resolution has introduced coherency problems. Coherency problems between multiple radar units generally refers to situations where the signals received by the radar units do not agree with each other because the radar units are not in sync or phase with each other and the information they provide is inconsistent. This can lead to errors in tracking targets, misidentification of objects, and other issues. To ensure the coherence of the radar units, they need to be properly calibrated and synchronized with each other, and the data they provide needs to be carefully analyzed and reconciled to ensure accuracy. This solution is complex and expensive relative to non-networked radar units.

What is desired are systems and methods that address these and other issues related to increasing radar aperture and/or resolution without increasing cost and complexity.

SUMMARY

This summary presents a simplified overview to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Various technologies described herein pertain to systems and methods for increasing radar resolution by, for example, combining radar information. In one embodiment, beamforming is performed using radar units that are individually coherent but collectively do not need to be coherent. Each radar unit transmits and receives its own signal to process and generate target information including beamforming information and/or virtual receiver channel information. The target information from each radar unit is then merged or summed to output combined beamforming information based on all the target information received from all the radar units. When the radar units used in this manner are separated by a distance, the resulting beamforming information is representative of an increased aperture/resolution based on the total space or distance between the radar units. Thus, having an improved resolution, benefits such as improved target resolution (e.g., size, position, and detection) can be achieved.

In one embodiment, a method is provided for improving radar systems. The method includes, for example, providing a first radar unit, where the first radar unit is set as a master radar unit, and providing a second radar unit, where the second radar unit is a distance from the first radar unit. The method also includes, for example, each radar unit emitting radar signals and only processing returned radar signals emitted from itself and each radar unit determining target information from its processed return radar signals. Determining the target information can include, for example, determining beamforming information for the targets. The method can further include, for example, transmitting from each radar unit the target information including the beamforming information to a central processing unit. The central processing unit can, for example, generate combined beamforming information by summing the target information including the beamforming information from each radar unit.

In another aspect, a method is provided for improving radar systems based on virtual receiver channel information. The method includes, for example, providing a first radar unit, where the first radar unit is set as a master radar unit, and providing a second radar unit, wherein the second radar unit is a distance from the first radar unit. The method further includes, for example, each radar unit emitting radar signals and only processing returned radar signals emitted from itself and each radar unit determining target information from its processed return radar signals. Determining target information can include, for example, generating a plurality of virtual receiver channels for each radar unit. The method further includes, for example, transmitting from each radar unit the target information including information from the virtual receiver channels to a central processing unit. The central processing unit can, for example, generate beamforming information by using the information from the virtual receiver channels from each radar unit.

In yet another example, a radar system is provided having, for example, at least first and second radar units separated by a first distance. Each radar unit emits radar signals and only processes returned radar signals emitted from itself. Each radar unit can output target information having beamforming information. A central processing unit is provided in circuit communication with the radar units and includes logic for receiving from each radar unit the target information including the beamforming information and logic for generating combined beamforming information by summing the target information including the beamforming information from each radar unit.

Various other embodiments and disclosures are also provided herein and thus this Summary is not intended to limit the scope of the disclosures.

BRIEF DESCRIPTION OF THE DRAWINGS

In the accompanying drawings which are incorporated in and constitute a part of the specification, disclosures and embodiments of the innovation(s) are illustrated, which, together with a general description given above, and the detailed description given below, serve to disclose and exemplify principles of the innovation(s).

DETAILED DESCRIPTION

Figure 1A:
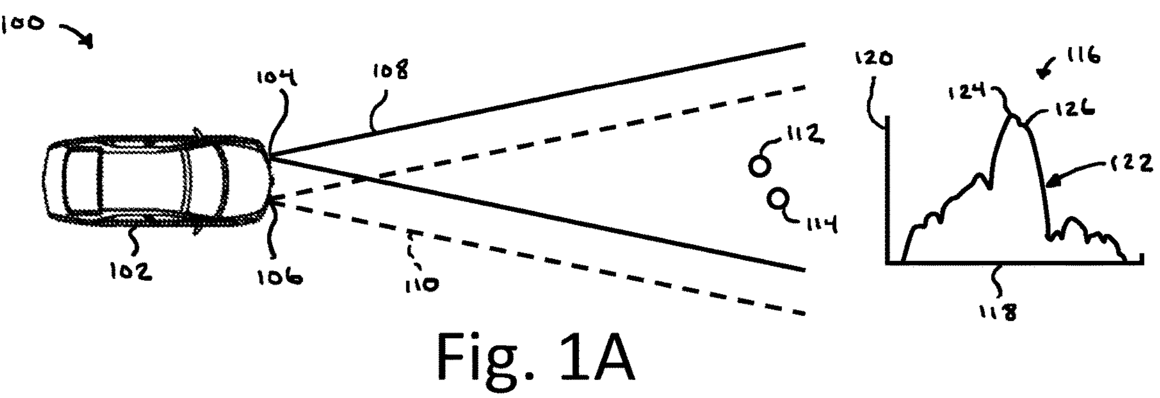
FIGS. 1A, 1B, and 1C are diagrams illustrating one embodiment of a system and method for increasing radar resolution.

Various technologies pertaining to radar systems and methods are now described with reference to the drawings, wherein like reference numerals are used to refer to like elements throughout. In the following description, for purposes of explanation, numerous specific details are set forth to provide a thorough understanding of one or more aspects. It may be evident, however, that such aspect(s) may be practiced without these specific details. In other instances, structures and devices are shown in block diagram form to facilitate a non-limiting description of one or more aspects of the disclosure. Further, it is to be understood that functionality that is described as being carried out by certain system components may be performed by multiple components. Similarly, for instance, a component may be configured to perform functionality that is described as being carried out by multiple components. Further, when two components are described as being connected, coupled, joined, affixed, in physical communication, etc., it is to be understood that one or more intervening components or parts can be included in such association.

Moreover, the term "or" is intended to mean an inclusive "or" rather than an exclusive "or." That is, unless specified otherwise, or clear from the context, the phrase "X employs A or B" (or other similar phrases) is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The terms "first," "second," "third," etc. are used herein for identification purposes. It is contemplated that components disclosed herein can be oriented in substantially any manner consistent with the disclosure. For instance, a "first" component need not come before a "second" or "third" component. Further, as used herein, the term "exemplary" is intended to mean "serving as an illustration or example of something."

"Software," as used herein, includes but is not limited to one or more computer readable and/or executable instructions that cause a computer or other electronic device to perform functions, actions, and/or behave in a desire manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Logic," synonymous with "circuit" as used herein, includes but is not limited to hardware, firmware, software and/or combinations of each to perform a function(s) or an action(s). For example, based on a desired application or needs, logic may include a software-controlled microprocessor, discrete logic such as an application specific integrated circuit (ASIC), or other programmed logic device. Logic may also be fully embodied as software.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Embodiments of the present disclosure provide systems and methods for increasing radar resolution by, for example, combining radar information. In one embodiment, beamforming is performed using at least two or more radar units that can be individually coherent but collectively do not need to be coherent. Each of the radar units transmits and receives its own signal and can process that signal(s) to generate target information including beamforming information and/or virtual receiver channel information. The target information from each radar is then merged or summed into a combined beamforming based on all the target information received from all the radar units. When the individual radar units are used in this manner and are separated by a distance, the resulting beamforming information is representative of an increased aperture/resolution based on the total space or distance between the radar units. This space or distance can be in 1 or 2 dimensions (e.g., elevation (vertical) and/or azimuth (horizontal)) Thus, having an improved aperture/resolution, benefits such as improved target resolution (e.g., size, position, and detection) can be achieved without the complexity associated with fully coherent radar networks.

Figure 1B:
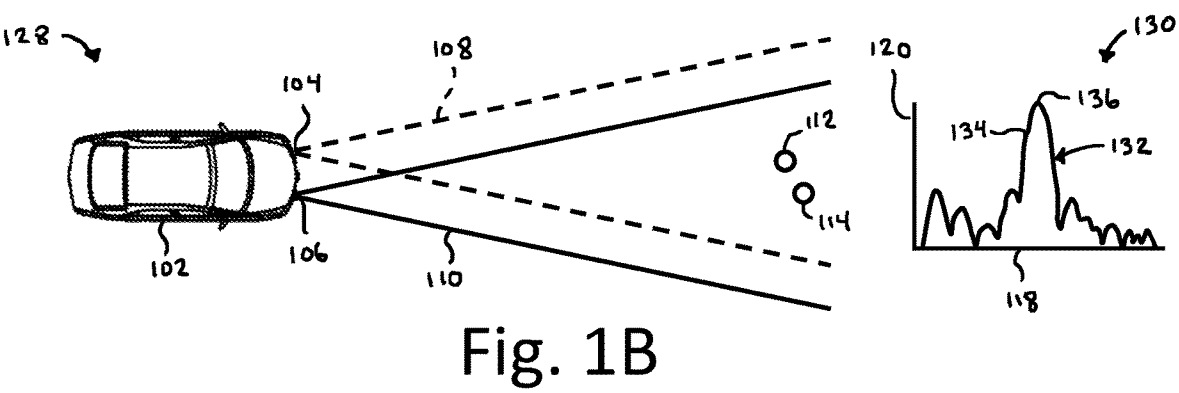
Figure 1C:
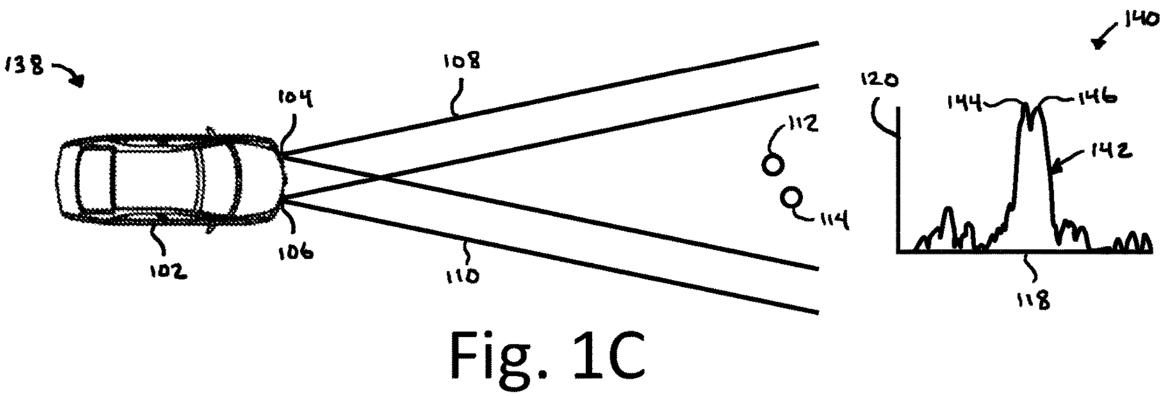

FIGS. 1A, 1B, and 1C are diagrams illustrating one embodiment of a system and method increasing radar resolution. With reference to FIG. 1A, radar units 104 and 106 are included in an autonomous vehicle (AV) 102 to identify and track objects or targets 112 and 114 that are within a sensing range 108 and/or 110 of the radar units (e.g., between 1 meter and 250 meters). Radar units 104 and 106 are separated by a space or distance, which can be a few centimeters to a meter or more. In one example, radar units 104 and 106 are separated by a space or distance of approximately 0.5 meters, but other distances greater or less than 0.5 meters can also be used. Radar units 104 and 106 are configured to generate detections (e.g., targets 112 and/or 114) within respective temporal detection windows. Each detection corresponds to a point or location in the environment that is within a range of the radar unit. Therefore, the radar unit, for each target detection, identifies a location for the detection relative to the radar unit's location and/or position (e.g., a distance between the target and the radar unit). In addition, radar units 104 and/or 106 can be configured to compute a respective velocity value for each target detection (e.g., a velocity of the target relative to the radar unit, Doppler information) and can be further configured to compute a respective direction value for each detection (e.g., a direction of the target relative to the radar unit).

One example of a radar unit 104 and/or 106 includes a frequency-modulated continuous-wave (FMCW) radar system, where an FMCW radar system is configured to transmit an FMCW signal that can include unique FMCW chirps or codes into the environment. These chirps or codes, among other things, identify the source (e.g., radar unit 104 or 106) of the radar signal. The FMCW radar system is further configured to detect radar signals having a frequency within a predefined spectrum. When a detected radar signal includes a reflection of an FMCW chirp off of a target, the radar system outputs a detection based upon a difference between a frequency of the local oscillator (LO) and a frequency of the detected radar signal over time, wherein a distance from the radar system to the target is based upon the difference between the frequency of the LO and the frequency of the detected radar signal. With more specificity, the radar system generates detections based upon the detected radar signal being downmixed with a local oscillator (LO), where the LO, in an example, corresponds to the emitted FMCW signal. The radar system can compute a velocity for a detection based upon phase of the downmixed signal and can employ beamforming technologies to compute a direction for the detection. For a temporal detection window, the radar system can generate numerous detections (where the number of detections may depend upon the range of the radar system, number of transmit and receive antennas, and other factors). Other types of radar signals in addition and/or in the alternative to FMCW can also be used by radar units 104 and/or 106.

Still referring to FIG. 1A, radar units 104 and/or 106 can be, for example, Multiple Input Multiple Output (MIMO) radar systems. Radar units 104 and 106 can be individually coherent via use of their own local oscillators, but other types of radar units can also be used. As will be described in more detail, MIMO radar units generally use in combination more than one transmitting antenna (e.g., Multiple Input) and more than one receiving antenna (Multiple Output). MIMO radar uses beamforming techniques to focus the transmitted and received signals from the multiple antennas onto specific target(s) (e.g., targets 112 and/or 114). Beamforming is generally the process of shaping the overall antenna pattern to concentrate the signal energy in a particular direction(s) (including, for example, the elevation and/or azimuth directions), thereby improving the system's performance in terms of signal-to-noise ratio and angular resolution.

MIMO radar beamforming can involve multiple steps including, for example, channel estimation, signal alignment, and adaptive filtering. In the first step, the radar system estimates the channel response between each transmitting antenna and each receiving antenna. This channel estimation is done by transmitting a known signal from each antenna (e.g., FMCW signal) and then correlating the received signal with the known signal.

Once the channel is estimated, the transmitted signals are aligned in time and frequency to compensate for any delays and phase shifts caused by the channel. The received signals from each antenna are then combined using beamforming to form a directional antenna pattern towards the target(s). Beamforming can adapt the beam pattern in real-time based on the estimated target parameters, such as range and angle of arrival. Beamforming generally determines the weights and phase compensation of each antenna using real and/or complex numbers to maximize the signal-to-noise ratio at the target location(s) while minimizing the interference from other directions. Beamforming in a MIMO radar system can be iterative and performed for each target of interest. The system selects the transmit waveform that provides the best signal-to-noise ratio for each target and applies beamforming to enhance the signal from the target while reducing the interference from other sources.

In FIG. 1A, a radar detection 100 is shown for radar unit 104. Radar unit 104 emits a radar signal as represented by 108. Objects such as 112 and/or 114 within the range of radar signal 108 reflect the radar signal back to radar unit 104. Radar unit 104 can use, for example, a unique code (or chirp) in its transmitted radar signal so that it only processes return radar signals that it has transmitted. In other words, each radar unit only transmits and receives its own signals and not those of other radar units. The reflected radar signals from radar unit 104 reflected by targets 112 and/or 114 are received by radar unit 104 while other radar signals are ignored. Though differing mechanisms or techniques can be used to distinguish radar signals, it is to be appreciated that a radar unit is capable of identifying its own radar signals.

Radar unit 104 processes its received signals to determine target information such as, for example, range, doppler (e.g., velocity and direction), elevation, and/or azimuth angles, etc. As described above, beamforming information can provide target range and angle information. In the example of FIG. 1A, beamforming information 116 for radar unit 104 can be represented as azimuth angle information 122 (e.g., in degrees), wherein axis 118 represents the azimuth angle and axis 120 represents the magnitude. The beamformed azimuth angle information 122 shows, in this example, a distinct peak 124 and small shoulder feature 126 with respect to the detection of targets 112 and 114 by radar unit 104. The lack of more than one distinct peak makes it difficult for the radar unit to determine if there is more than one target present due to the close proximity (e.g., a few degrees apart) of the targets to each other.

Referring now to FIG. 1B, a radar detection 128 is shown for radar unit 106. Like radar unit 104, radar unit 106 emits a unique radar signal as represented by 110. Objects such as 112 and/or 114 within the range of radar signal 110 reflect the radar signal back to radar unit 106. Radar unit 106 processes its received signals to determine its own target information such as, for example, range, doppler (e.g., velocity and direction), elevation, and/or azimuth angles, etc. And, as described above, beamforming information can provide target range and angle information. In the example of FIG. 1B, beamforming information 130 for radar unit 106 can be represented as azimuth angle information 132. Beamformed azimuth angle information 132 shows, in this example, a small shoulder feature 134 and a distinct peak 136 with respect to the detection of targets 112 and 114 by radar unit 106. The lack of more than one distinct peak again makes it difficult for the radar unit to determine if there is more than one target present.

FIGS. 1A and 1B represent the target information (in this case, the beamformed azimuth angle information) of detected targets 112 and 114. As can be seen in the beamformed azimuth angle information 116 and 132, each radar unit provides a relatively low-resolution of the azimuth angle difference when targets 112 and 114 are relatively close together (e.g., within a few degrees or less). This can cause issues such as, for example, target misidentification.

FIG. 1C illustrates a radar detection 138 wherein the target information including the beamforming information from both radar units 104 and 106 is used together to enhance the overall resolution of the target detections. In one embodiment, this information is used collectively even though the radar units are individually coherent but not necessarily collectively. As shown and described in FIG. 1A, radar unit 104 detects targets 112 and 114 and generates beamforming information 116 representing, for example, target azimuth angle information. Similarly, and as shown and described in FIG. 1B, radar unit 106 detects targets 112 and 114 and generates beamforming information 130 representing again, for example, target azimuth angle information. In one embodiment, the beamforming information 116 and 130 can be combined via another beamforming to produce combined beamforming information 140. Combined beamforming information 140 includes, for example, combined azimuth angle information 142 generated from beamforming information 116 and 130 of radar units 104 and 106. Combined beamformed azimuth angle information 142 includes distinct first and second peaks 144 and 146 representing targets 112 and 114. In comparison to the individual beamformed azimuth angle information (e.g., 116 (FIG. 1A) and 132 (FIG. 1B)), the resolution of the combined beamformed azimuth angle detection has increased as shown by the presence of not one but two distinct peaks (e.g., 144 and 146). The presence of two distinct peaks provides a better target detection in the azimuth angle dimension. With two distinct peaks, the radar system is better able to recognize the presence of two objects even though they may be relatively close together. This provides a higher radar resolution compared to using just the individual radar units and without the cost and complexity of networked fully coherent radar units where each/all individual radar units must be synchronized with a common oscillator signal.

Figure 2A:
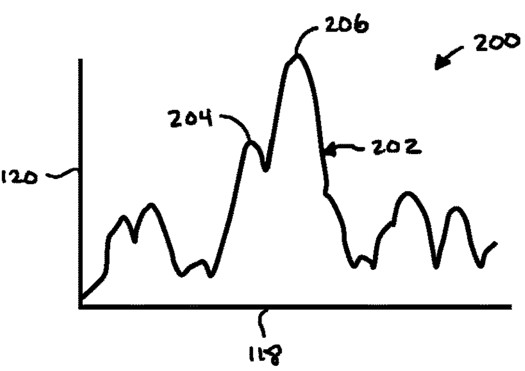
FIGS. 2A, 2B, and 2C are diagrams illustrating beamforming information from first and second radar units and their combination.
Figure 2B:
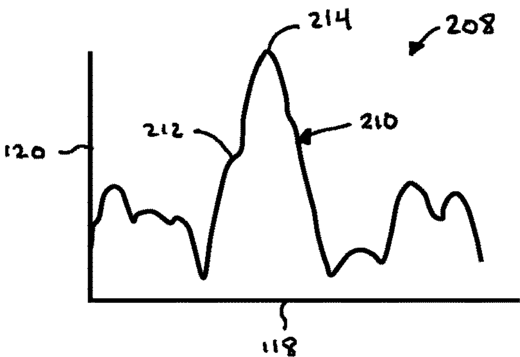
Figure 2C:
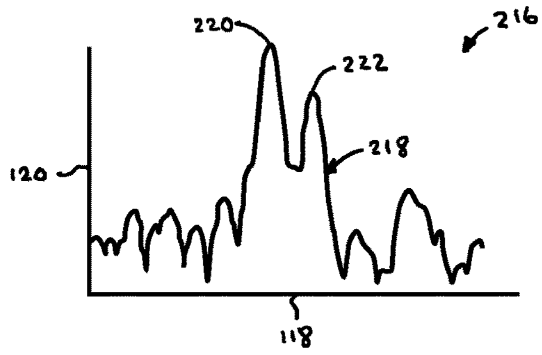

FIGS. 2A, 2B, and 2C are diagrams illustrating beamforming information from first and second radar units and their combination for the case where targets 112 and 114 (FIGS. 1A, 1B, & 1C) are moving targets (e.g., towards/away from the radar units). FIG. 2A represents the detection 100 shown in FIG. 1A and the resulting beamforming information 200 from radar unit 104. Beamforming information 200 includes azimuth angle information 202 showing first peak 204 and second peak 206 based on detection of targets 112 and 114. Notably, first peak 204 is much less in magnitude than second peak 206. FIG. 2B represents the detection 128 shown in FIG. 1B and the resulting beamforming information 208 from radar unit 106. Beamforming information 208 includes azimuth angle information 210 showing a small shoulder 212 and a distinct peak 214 based on detection of targets 112 and 114. Like FIGS. 1A and 1B, the resolution of the azimuth angle information 202 and 210 as shown provide a demanding scenario for the radar system to distinguish if there is one or two targets present.

FIG. 2C represents the detection 138 shown in FIG. 1C and the resulting combined beamforming information 216 from radar units 104 and 106 (e.g., FIGS. 2A and 2B). Beamforming information 216 includes azimuth angle information 218 showing a distinct first peak 220 and a distinct second peak 222 based on detection of targets 112 and 114. In comparison to the individual beamformed azimuth angle information (e.g., 200 (FIG. 2A) and 208 (FIG. 2B)), the resolution of the combined beamformed azimuth angle detection has increased as shown by the presence of not one but two distinct peaks (e.g., 220 and 222). As described previously, the presence of two distinct peaks provides a better target detection in the azimuth angle dimension. With two distinct peaks, the radar system is better able to recognize the presence of two objects even though they may be moving toward/away from the radar units and may be relatively close together. This provides a higher radar resolution compared to using just the individual radar units and without the cost and complexity of networked fully coherent radar units where each individual radar unit must be synchronized with a common oscillator signal.

While the above examples have been described with respect to improved azimuth angle information, the same techniques can be applied with respect to elevation angle information and other beamforming information. The use of locally coherent radar units, but not collectively coherent, provides an adequately reliable target information estimation because the radar units operate at high frequencies and the delays involved in transmitting the real-time target information (e.g., beamforming and/or virtual receiver channel information) from the radar units to a central processing unit for combined beamforming/virtual receiver channel processing is small. Thus, full coherency between the radar units is not necessary to obtain an accurate estimation of target information (e.g., elevation, azimuth, range, doppler/velocity, etc.) Moreover, while the above examples have been described with two radar units, more than two can also be used.

Figure 3:
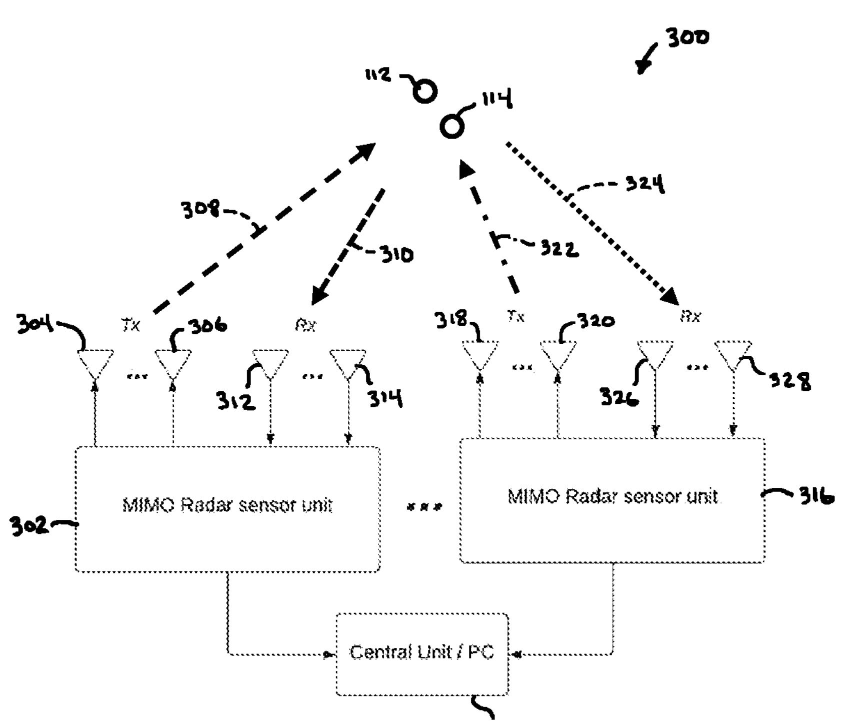
FIG. 3 is a block diagram illustrating one embodiment of a system and method for increasing radar resolution.

FIG. 3 is a block diagram illustrating one embodiment 300 of a system and method for increasing radar resolution. The system and method include a plurality of radar units as represented by 302 and 316. In the case of FIGS. 1A-1C and 2A-2C, radar units 104 and 106 can be represented by radar units 302 and 316. One or more of the radar units can be a MIMO radar unit having multiple transmission antennas 304 to 306 and multiple receiver antennas 312 to 314 in the case of radar unit 302. Additional radar units such as, for example, radar unit 316 can be similarly arranged having multiple transmission antennas 318 to 320 and multiple receiver antennas 326 to 328. Each radar unit transmits, in one embodiment, its own radar signals (e.g., 308, 322) and receives its own return radar signals (e.g., 310, 324). The received radar signal is processed into beamforming information and/or virtual receiver channel information within the radar units before being transmitted to a central unit/computer 330 where processing/logic generates combined beamforming information for increasing the resolution of the radar system 300.

Radar units (e.g., 302, 316) generate beamforming information by employing multiple antennas for transmitting and receiving electromagnetic signals. Radar unit 302 will be described with the understanding that such description equally applies to radar unit 316. Radar unit 302 transmits multiple independent waveforms 308 from different antennas 304, 306 simultaneously. The transmitted waveforms 308 propagate through the environment and interact with any targets (e.g., 112, 114) in their path. The scattered signals 310 from the targets 112, 114 are then received by multiple antennas 312, 314. Each received signal 310 contains information about the range, velocity, and angle of the target. The received signals 310 are processed by the radar unit to estimate, for example, a target's position (e.g., range, elevation, azimuth angle), velocity, and other parameters of interest. The signal processing in radar unit 302 can include, for example, several steps such as signal synchronization and target detection. In the synchronization step, the received signals 310 are synchronized in time and frequency to align with the transmitted waveforms 308. In the target detection step, the radar unit uses advanced signal processing techniques, such as matched filtering and adaptive beamforming, to detect and locate the targets. These steps are meant to be representative and more or less steps can be used. The multiple antennas provide a spatial diversity allowing the radar unit to distinguish between multiple targets and to mitigate any interference caused by the environment. As previously described, to increase the overall radar system's ability to distinguish between multiple targets, the beamforming and/or virtual receiver channel information from multiple spaced apart radar units can be processed into combined beamforming information having a higher resolution than each individual radar unit without the need for full coherency between the radar units.

Figure 4:
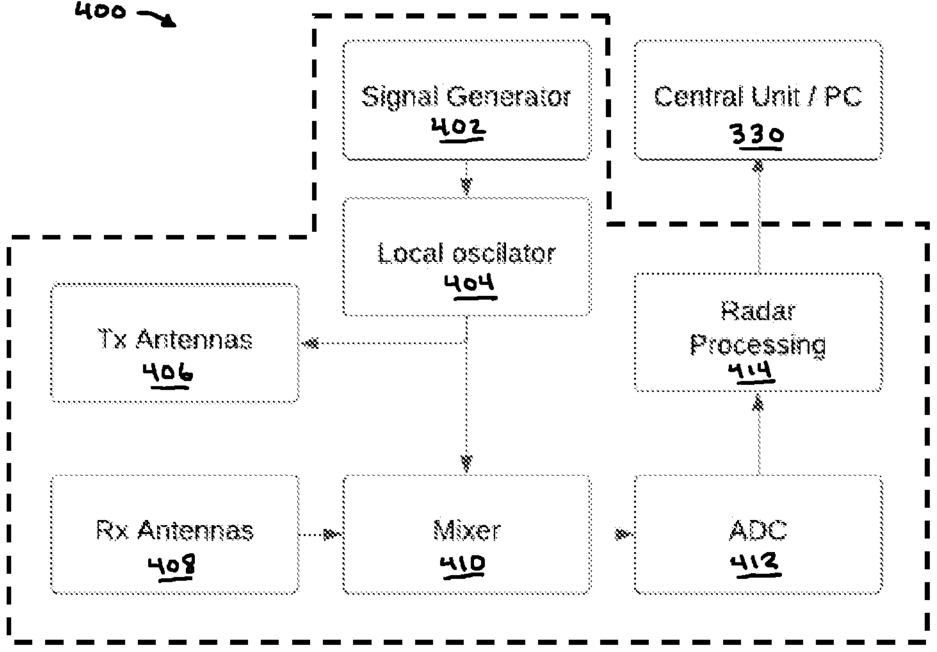
FIG. 4 is a block diagram of one embodiment of a radar unit for a system and method for increasing radar resolution.

FIG. 4 is a block diagram of one embodiment of a radar unit 400 for a system and method for increasing radar resolution. Radar unit 400, which can be any of the previously described radar units (e.g., 104, 106, 302, and/or 316), has several components, including a signal generator 402, local oscillator 404, transmitter antennas Tx 406, receiver antennas Rx 408, mixer 410, ADC (Analog-to-Digital Converter) 412, and radar processing unit 414. The signal generator 402 is responsible for generating the radar signal(s) that are to be transmitted. The frequency of the signal is determined by the local oscillator 404, which generates a signal used to mix with the signal from the signal generator 402. The resulting mixed signal is then transmitted through the transmitter antennas Tx 406.

The transmitter antennas Tx 406 are responsible for emitting the radar signal into the environment. In the present embodiment, MIMO radar units are used and have multiple transmitter antennas Tx 406, each of which can be independently controlled to transmit the signal in different directions. This allows for a wider field of view and improved resolution for the radar unit 400. Once the radar signal is transmitted, it interacts with the environment and is scattered back towards the receiver antennas Rx 408. The receiver antennas Rx 408 are responsible for collecting the scattered signal, which is then mixed with the local oscillator 404 signal using the mixer 410. The mixed signal is then sent to ADC 412, which converts the analog signal into a digital signal that can be processed by the radar processing unit 414. The radar processing unit 414 is responsible for processing the received signal to extract information about the environment, such as the location and velocity of objects. The previous description is just one example of a functional radar unit. In other embodiments, the radar unit may include more or less components than those shown including memories, logic, communication channels, processing circuits, connectors, etc.

Figure 5:
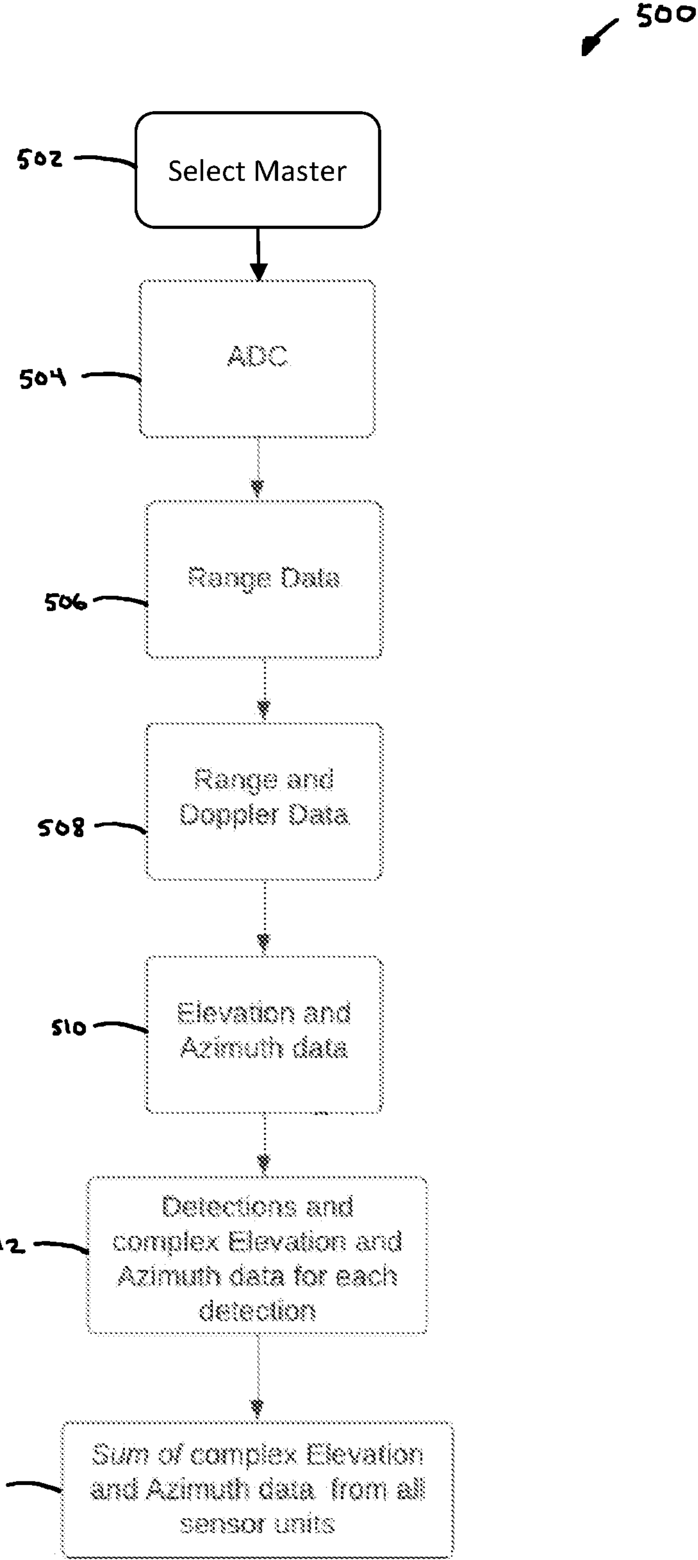
FIG. 5 illustrates one embodiment of a flow diagram for a system and method for increasing radar resolution.

FIG. 5 illustrates one embodiment of a flow diagram 500 for a system and method for increasing radar resolution. The flow diagram(s) shown and described herein do not depict syntax of any particular programming language. Rather, the flow diagram(s) illustrate the functional information that may be used to fabricate circuits or computer software to perform the processing of the system. It should be noted that many routine program elements, such as initialization of loops and variables and the use of temporary variables are not shown. Furthermore, the exact order of the process steps need not necessarily be performed in the order shown or described herein and may be modified to exclude certain steps. Moreover, the flow diagrams described herein can be embodied in, for example, software and/or logic executed by analog and/or digital circuitry and can be stored in external memories (e.g., RAMs, ROMs, etc.) and/or internal memories of controllers. Moreover, cloud-based storage can also be used from which such software and/or logic is downloaded, uploaded, and/or executed (either locally or remotely).

In block 502, a radar unit is selected as a master for identifying a reference location or position. The remaining radar units' positions are determined with reference to the position of the master radar unit. For example, in FIGS. 1A-1C, if radar unit 104 is selected as the master, then radar unit 106 transmitter and receiver antenna positions are referenced with regard to radar unit 104 (master). Thus, if radar unit 104 is the master and there is 0.5 m distance between it and radar unit 106, then the center of the virtual receiver channel (Vrx) for radar unit 104 is zero (0) and the center of virtual receiver channel (Vrx) for radar unit 106 is 0.5. The steering vector/matrix (e.g., amplitude and phase of the transmitted/received signals) of the transmitter and receiver antennas used in beamforming for radar unit 106 are modified to be in reference to the position of radar unit 104 (e.g., the master). In other embodiments, radar unit 106 (or another radar unit) can be selected as a master and used accordingly.

In block 504, the analog radar signals received by the multiple antennas are converted into digital signals. This is done using, for example, analog-to-digital converters (ADCs) to capture and digitize the signals. In block 506, the radar unit uses the digitized signals to determine the distance (or range) to the target(s). This is done by, for example, measuring the time it takes for the transmitted signal to bounce off the target and return to the receiver. The range data is then extracted from the received signal by measuring this time difference. One way of measuring this time difference is to apply a Fast Fourier Transformation (FFT) on the received signal to obtain a peak representing the range of the target that reflected the signal. As previously described, in one embodiment, each radar unit only processes its own signal(s) and not those of other radar units.

In block 508, Doppler data is determined from the received signal(s) by each radar unit. A Doppler shift is the change in frequency of received signal due to the motion of the target relative to the radar. By measuring the Doppler shift, the radar unit can determine the speed and direction of the target. In one embodiment, the Doppler data is determined by applying an FFT on the range data to obtain target velocity and direction information/data.

In block 510, the target elevation and azimuth information/data is determined by, for example, applying beamforming to virtual channels of the radar unit. In beamforming, the radar unit can electronically steer/rotate the transmitted signal radiation pattern to scan an area of interest. This is accomplished by a steering matrix of complex values representing, for example, the amplitude and phase shift(s) to be applied to the transmitted signal(s) to control the direction of the radar beam. By adjusting the phase shifts (or steering vectors) in real time, the radar unit can steer the beam to different directions and angles allowing it to cover a wide range of space and detect targets. As the radar scans, it emits a beam of electromagnetic energy that reflects off the target and returns to the radar unit. The phase shift information can be used to determine the angle (e.g., azimuth) at which the beam is emitted and the angle at which the reflected signal is received to calculate the target's azimuth angle relative to the radar. Also, the complex values of the beamforming can be determined by applying Discrete Fourier Transformations (DFT) (or Fast Fourier Transformations in the case of a linear array radar unit) on the virtual receiver channel to obtain the target amplitude and phase shift information.

As described in connection with FIGS. 1A-1C and 2A-2C, this beamforming information (e.g., azimuth angle and/or elevation angle) can be determined in each radar unit and then combined with that of other spaced-apart radar units to obtain combined beamforming information having higher resolution (e.g., in at least the azimuth angle). This allows the overall radar system to better distinguish targets that are in relatively close proximity to each other without the need for full coherency between the radar units.

To determine the target's elevation, the radar unit typically includes a phased array antenna. A phased array antenna includes a grid of antennas that can be controlled individually to steer the beam in different directions as previously described above. By controlling the phase of each antenna's signal, the antenna can steer the beam vertically up or down (e.g., elevation) to scan the area of interest. As already described, the angle at which the beam is steered and the angle at which the reflected signal is received are used to calculate the target's elevation angle relative to the radar unit.

In another embodiment, target elevation and azimuth angle information can be obtained by beamforming Discrete Fourier Transformation (DFT). In beamforming DFT, the signals reflected from a target of a directed/steered radar beam are transformed into a spatial spectrum of frequencies. To determine the target's azimuth angle, the radar unit analyzes the spatial spectrum along the horizontal axis. The peak of the spectrum corresponds to the direction of the target, and the angle of the peak relative to the horizontal axis corresponds to the target's azimuth angle. To determine the target's elevation angle, the radar system analyzes the spatial spectrum along the vertical axis. Again, the peak of the spectrum corresponds to the direction of the target, and the angle of the peak relative to the vertical axis corresponds to the target's elevation angle. Once determined, the azimuth and elevation angle information can also be represented by complex-values of the beamformed steering matrix having amplitude and phase information of the received signal(s).

In blocks 512 and 514, the target detections including the beamforming information (e.g., complex elevation and azimuth angle information) for each detection from each radar unit are combined or summed to provide a combined beamforming with improved resolution. Because the radar units are separated by a space or distance (e.g., 0.5 m), combining their beamforming information provides a radar of increased aperture and, hence, resolution (e.g., see FIGS. 1C and 2C). In one embodiment, blocks 502-508 are performed by each individual radar unit. In this manner, only the beamforming information (e.g., azimuth and/or elevation angle) needs to be output or transmitted to a central processing unit (e.g., 330) for combining the beamforming information. This reduces the amount of data/information that needs to be transmitted from the radar unit to the central processing unit.

In one embodiment, only detections that have been estimated in all radar units (same doppler and range cell) are processed in the network. In other embodiments, to reduce the data transmitted to the central unit, only angle information of the area of interest of increased resolution can be transmitted. The transmitted signals from the radar units do not need to be completely time-synchronous (i.e., coherent) because it is expected that the transmission time difference between the radar units is smaller than the possible range/doppler migration of the targets during the measurements.

As will be described, in other embodiments, virtual receiver channel Vrx information of a MIMO radar can also be transmitted to the central processing unit. This can include, for example, the amplitude and phase of the signal(s) received by each virtual receiver antenna of the MIMO radar and/or the digital equivalent. In this embodiment, the target information (e.g., range, Doppler, azimuth, elevation, etc.) in blocks 504-508 can be generated by the central processing unit for each radar unit and then that information can be combined or summed (in blocks 510 and 512) to provide the combined beamforming information having better resolution than the individual radar units.

Figure 6A:
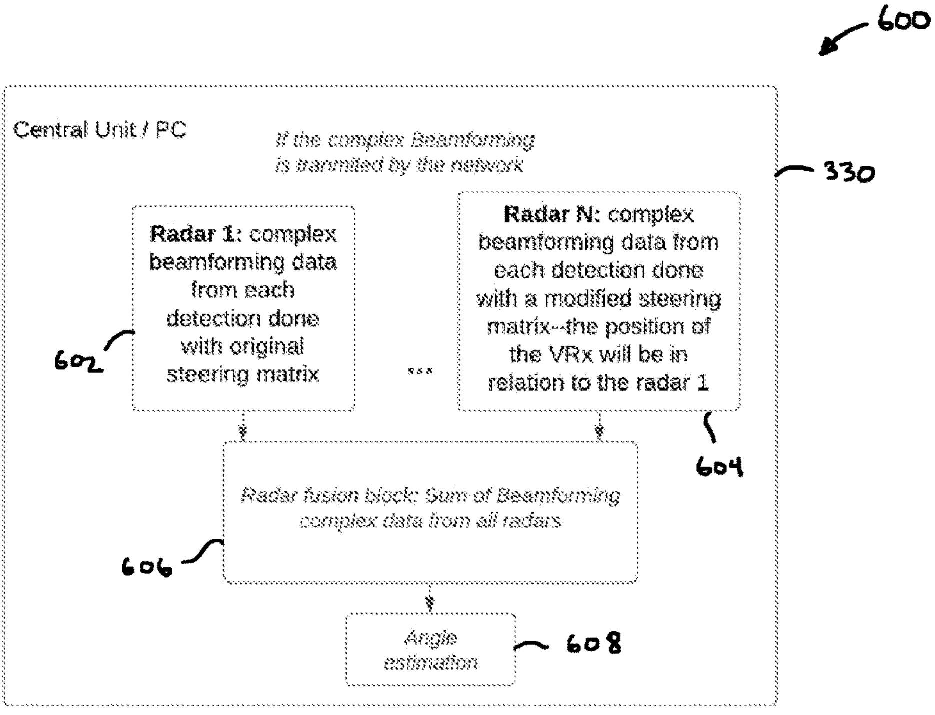
FIGS. 6A and 6B illustrate additional embodiments of a flow diagram for a system and method for increasing radar resolution.
Figure 6B:
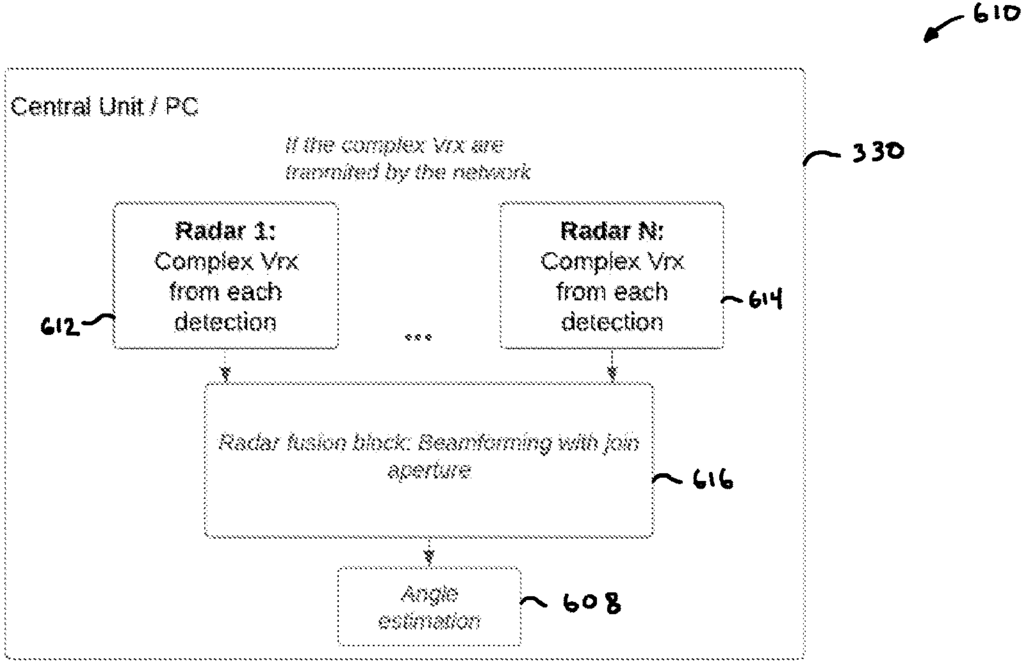

FIGS. 6A and 6B illustrate additional embodiments of a flow diagram for a system and method for increasing radar resolution. FIG. 6A illustrates a system and method 600 where the central processing unit 330 receives and processes the complex beamforming information from each radar unit (e.g., 1 to N radar units). For example, in block 602, the central processing unit reads the complex beamforming information/data for each detection from radar unit 1 with its original steering matrix/vectors (when radar unit 1 is selected as the master). In block 604, central processing unit 330 reads the remaining radar units (up to radar unit N) complex beamforming information/data for each detection but uses a modified steering matrix/vectors based on the virtual receiver channel Vrx of each radar unit relative to the position of radar unit 1 (e.g., the master). In block 606, a combined beamforming is performed using the complex beamforming information for all the radar units to obtain a combined angle (e.g., azimuth and/or elevation) estimation for the targets (block 608).

FIG. 6B illustrates a system and method 610 where the central processing unit 330 receives and processes the virtual receiver channel Vrx information instead of beamforming information from each radar unit (e.g., 1 to N radar units). For example, in blocks 612 and 614, the central processing unit reads the virtual receiver channel Vrx information for each detection from each radar unit (e.g., 1 to N). In block 616, a combined beamforming is performed based on a join aperture using the virtual receiver channel Vrx information for all the radar units to obtain a combined angle (e.g., azimuth and/or elevation) estimation for the targets (block 608).

In some embodiments, processing the virtual receiver channel Vrx information can be helpful when the distance between the radar units is much larger than the size of the virtual array of each radar unit. This is because the system and method can perform side lobe mitigation actions including, for example, a compressed sensing technique (e.g., reducing the number of samples required to form the beam pattern while still maintaining good resolution and sidelobe suppression). As shown and described in FIG. 6B, the Vrx channels of each detection are transmitted (in, for example, block 510) instead of the complex beamforming output (e.g., beamformed azimuth and/or elevation information). In this manner, central processing unit 330 processes beamforming with compressed sensing or some high angular estimation methods based on MUSIC (MUltiple SIgnal Classification) correlation.

Figure 7:
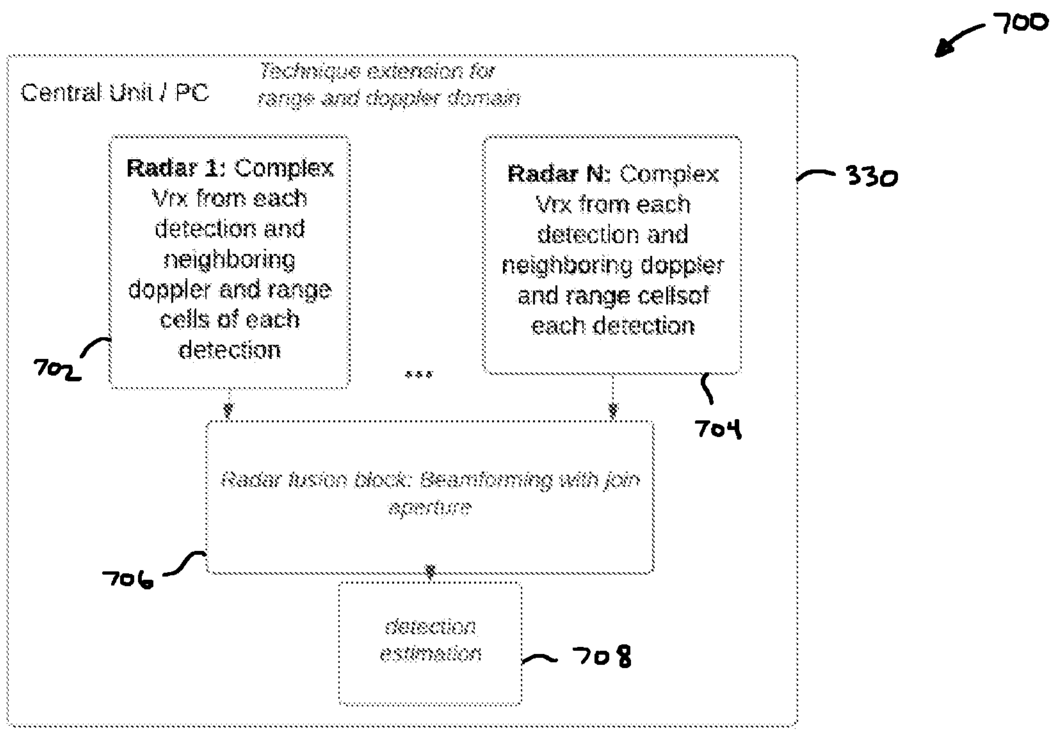
FIG. 7 illustrates yet another embodiment of a flow diagram for a system and method for increasing radar resolution.

FIG. 7 illustrates another embodiment of a system and method 700 for increasing radar resolution based on inclusion of neighboring Doppler cells of the detections. Neighboring Doppler cells are generally the range cells neighboring the target detection cell(s). In the embodiment of FIG. 7, virtual receiver channel Vrx information multiple radar cells are used. For example, the virtual receiver channel Vrx information from the target detection cell and the neighboring cells (e.g., the range and Doppler cells) (see blocks 702 and 704) are beamformed (in block 706) by the central processing unit 330 to provide an improved target detection and other target information (e.g., range, Doppler, velocity, azimuth, elevation, etc.) This increases the probability of distinguishing targets when a small range or doppler offset (or small difference in resolution) is used between the network's radar units (e.g., smaller than a cell range to not compromise beamforming).

In yet other embodiments, if the targets are in the nearfield of the joint aperture, a nearfield angle compensation can be performed by the radar units (104, 106) and/or central processing unit 330. Nearfield angle compensation employs a model of the nearfield region using mathematical equations that correct for the distortion caused by the nearfield region on the estimated angle of arrival of the signals.

Further yet, in other embodiments, windows can be used in defining the beamforming information. The windows on each radar can be the same or different and can overlap. For example, for a radar unit having a resolution of 1 degree per unit and a target detection estimated at 20 degrees, only the beamforming information around the estimated target detection can be sent/used by central processing unit 330. In this case, a window of 18 to 22 degrees can be used to define the beamforming data sent/used by central processing unit 330. In other embodiments, windows of different size can be used depending on the radar unit's resolution.

As described, the systems and methods can be used for both one-dimensional and two-dimensional beamforming. Hence, the increase in aperture/resolution can be obtained either on the horizontal, vertical or both directions. Also, the radar units in the sensor network can have different arrays (e.g., position and/or number of Tx and Rx elements) resulting in, for example, single beamforming and join beamforming results having different sidelobes. These additional/different sidelobes make it possible to mitigate the estimation of false detections by sidelobes.

Further yet, in certain embodiments, a network communication protocol can be provided whereby central processing unit 330 can receive information from each radar unit. This includes, for example, requesting missing information/data from one or more of the sensors in the network. Other requests can also be made. Thus, the communication channel between central processing unit 330 and the radar units can be bidirectional.

Hence, the systems and methods disclosed provide for increasing radar resolution by, for example, combining radar information that is not fully coherent. Beamforming is performed using radar units that are individually coherent but collectively do not need to be coherent. Each radar transmits and receives its own signal to process and generate target information including beamforming information and/or virtual receiver channel information. The target information from each radar is then combined or summed into a combined beamforming based on some or all the target information received from more than one radar unit. When the radar units used in this manner are separated by a distance, the resulting beamforming information is representative of an increased aperture/resolution based on the space or distance between the radar units. Thus, having an improved resolution, benefits such as improved target resolution (e.g., size, position, and detection) can be achieved without the cost and expense of fully coherent radar networks.

Figure 8:
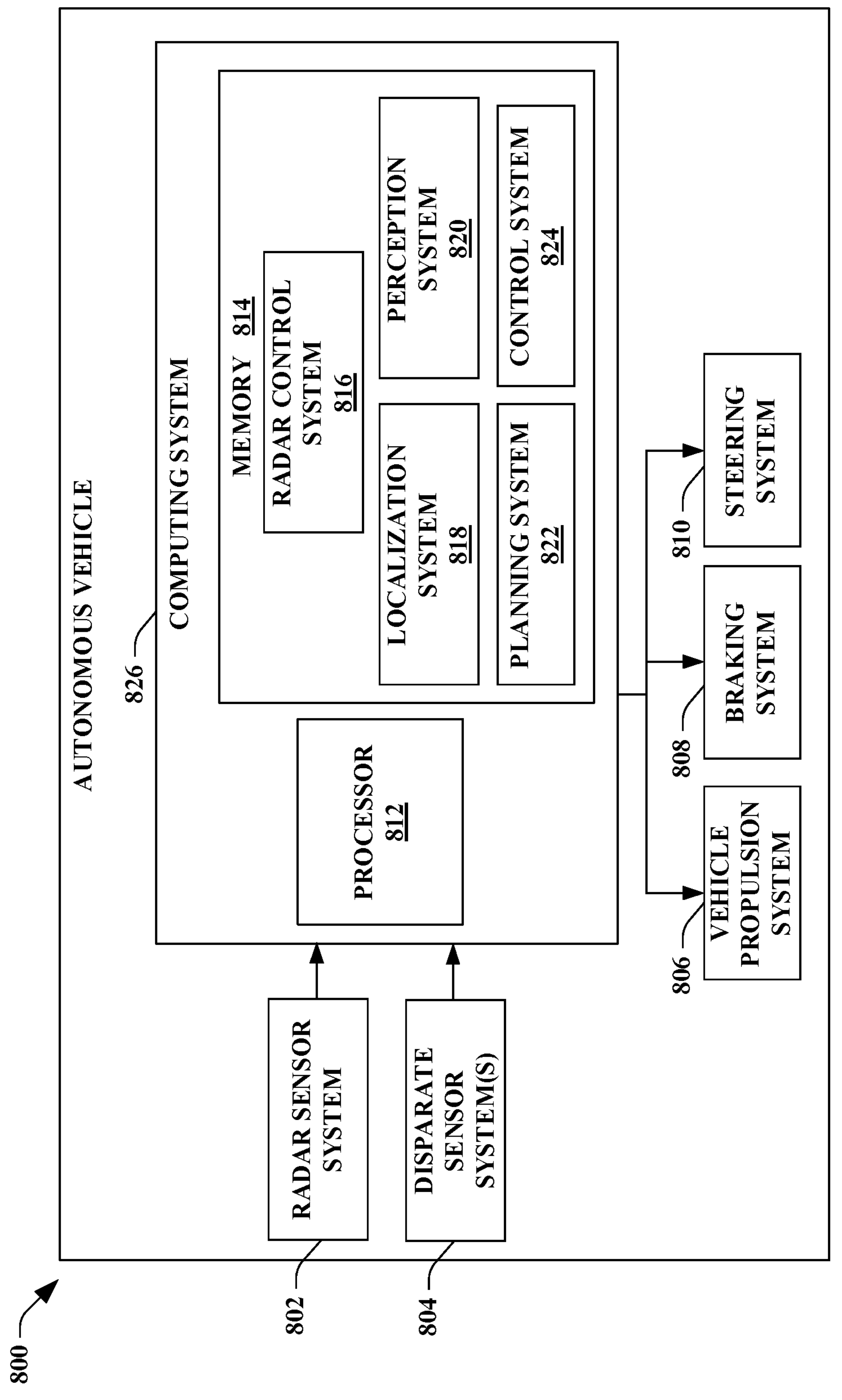
FIG. 8 illustrates an autonomous vehicle according to various embodiments.

Turning to FIG. 8, illustrated is an autonomous vehicle 800 according to various embodiments. The autonomous vehicle 800 can navigate about roadways without human conduction based upon sensor signals outputted by sensor systems of the autonomous vehicle 800. The autonomous vehicle 800 includes a plurality of sensor systems. More particularly, the autonomous vehicle 800 includes a radar sensor system 802 (e.g., the radar units 104 and 106, the radar units 302 and 316, the radar system 300). The autonomous vehicle 800 can further include one or more disparate sensor systems 804. The disparate sensor systems 804 can include GPS system(s), ultrasonic sensor(s), infrared system(s), camera system(s), lidar system(s), additional radar sensor system(s), and the like. The sensor systems 802 and 804 can be arranged about the autonomous vehicle 800.

The autonomous vehicle 800 further includes several mechanical systems that are used to effectuate appropriate motion of the autonomous vehicle 800. For instance, the mechanical systems can include, but are not limited to, a vehicle propulsion system 806, a braking system 808, and a steering system 810. The vehicle propulsion system 806 may be an electric engine or a combustion engine. The braking system 808 can include an engine brake, brake pads, actuators, and/or any other suitable componentry that is configured to assist in decelerating the autonomous vehicle 800. The steering system 810 includes suitable componentry that is configured to control the direction of movement of the autonomous vehicle 800.

The autonomous vehicle 800 additionally includes a computing system 826 that is in communication with the sensor systems 802 and 804, the vehicle propulsion system 806, the braking system 808, and the steering system 810. The computing system 826 can include or be the central processing unit 330. The computing system 826 includes a processor 812 and memory 814; the memory 814 includes computer-executable instructions that are executed by the processor 812. Pursuant to various examples, the processor 812 can be or include a graphics processing unit (GPU), a plurality of GPUs, a central processing unit (CPU), a plurality of CPUs, an application-specific integrated circuit (ASIC), a digital signal processor (DSP), a microcontroller, a programmable logic controller (PLC), a field programmable gate array (FPGA), or the like.

The memory 814 of the computing system 826 can include a radar control system 816, a localization system 818, a perception system 820, a planning system 822, and a control system 824. The radar control system 816 is configured to control the radar sensor system 802. For example, the radar control system 816 can generate combined beamforming information as described herein. The localization system 818 can be configured to determine a local position of the autonomous vehicle 800. The perception system 820 can be configured to perceive objects nearby the autonomous vehicle 800 (e.g., based on outputs from the sensor systems 802 and 804). For instance, the perception system 820 can detect, classify, and predict behaviors of objects nearby the autonomous vehicle 800. The perception system 820 (and/or differing system(s) included in the memory 814) can track the objects nearby the autonomous vehicle 800 and/or make predictions with respect to the environment in which the autonomous vehicle 800 is operating (e.g., predict the behaviors of the objects nearby the autonomous vehicle 800). Further, the planning system 822 can plan motion of the autonomous vehicle 800. Moreover, the control system 824 can be configured to control at least one of the mechanical systems of the autonomous vehicle 800 (e.g., at least one of the vehicle propulsion system 806, the braking system 808, and/or the steering system 810).

An operation of the autonomous vehicle 800 can be controlled by the computing system 826 based at least in part on the information generated by the radar control system 816. While the radar sensor system 802 is described as being included as part of the autonomous vehicle 800 in FIG. 8, it is contemplated that the radar sensor system 802 can be utilized in other types of scenarios (e.g., included in other types of systems, etc.). Moreover, in other embodiments, it is contemplated that the radar sensor system 802 can include the radar control system 816 and/or the radar control system 816 can be separate from the computing system 826 described in FIG. 8 (e.g., the radar control system 816 can be a standalone computing system separate from both the radar sensor system 802 and the computing system 826).

Figure 9:
FIG. 9 illustrates an exemplary computing device.
Figure 9:
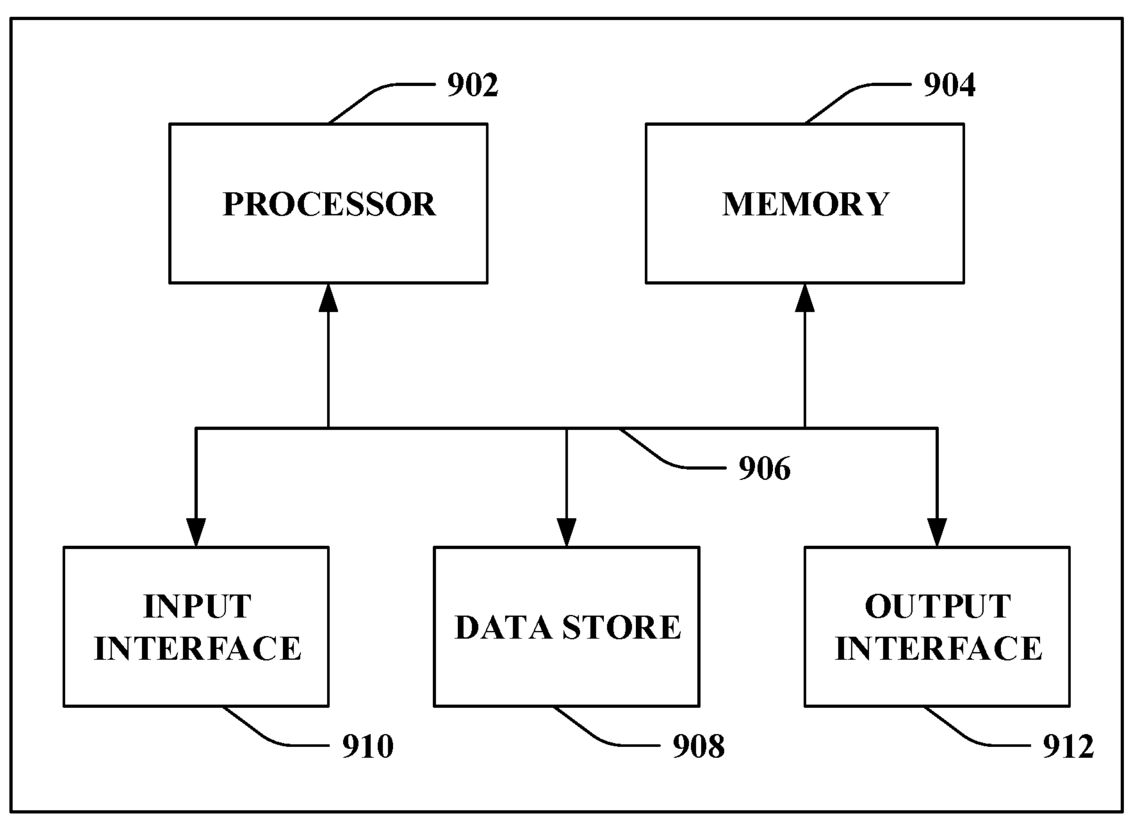

Referring now to FIG. 9, a high-level illustration of an exemplary computing device 900 that can be used in accordance with the systems and methodologies disclosed herein is illustrated. For instance, the computing device 900 may be or include the computing system 826. According to another example, the computing device 900 may be or include radar processing circuitry of a radar unit. The computing device 900 includes at least one processor 902 that executes instructions that are stored in a memory 904. The instructions may be, for instance, instructions for implementing functionality described as being carried out by one or more systems discussed above or instructions for implementing one or more of the methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store radar data, beamforming information, and so forth.

The computing device 900 additionally includes a data store 908 that is accessible by the processor 902 by way of the system bus 906. The data store 908 may include executable instructions, radar data, beamforming information, etc. The computing device 900 also includes an input interface 910 that allows external devices to communicate with the computing device 900. For instance, the input interface 910 may be used to receive instructions from an external computer device, etc. The computing device 900 also includes an output interface 912 that interfaces the computing device 900 with one or more external devices. For example, the computing device 900 may transmit control signals to the vehicle propulsion system 806, the braking system 808, and/or the steering system 810 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a method is described herein. The method includes providing a first radar unit, wherein the first radar unit is set as a master radar unit, and providing a second radar unit, wherein the second radar unit is a distance from the first radar unit. Each radar unit emitting radar signals and only processing returned radar signals emitted from itself. Moreover, each radar unit determining target information from its processed return radar signals; wherein this step includes determining beamforming information for the targets. Further, the method includes transmitting from each radar unit the target information including the beamforming information to a central processing unit. Moreover, the method includes, in the central processing unit, generating combined beamforming information by summing the target information including the beamforming information from each radar unit.

(A2) In some embodiments of the method of (A1), transmitting from each radar unit the target information including the beamforming information comprises transmitting azimuth information.

(A3) In some embodiments of the method of (A1), transmitting from each radar unit the target information including the beamforming information comprises transmitting azimuth and elevation information.

(A4) In some embodiments of at least one of the methods of (A1)-(A3), generating combined beamforming information by summing the target information including the beamforming information from each radar unit comprises virtual receiver channel information.

(A5) In some embodiments of at least one of the methods of (A1)-(A4), generating combined beamforming information by summing the target information including the beamforming information from each radar unit comprising generating a virtual radar aperture greater than the radar aperture of the first or second radar units.

(A6) In some embodiments of at least one of the methods of (A1)-(A5), generating combined beamforming information by summing the target information including the beamforming information from each radar unit comprises generating a virtual receiver channel for the second radar unit in relation to the first radar unit.

(A7) In some embodiments of at least one of the methods of (A1)-(A6), generating combined beamforming information by summing the target information including the beamforming information from each radar unit comprises using beamforming information from the first radar unit with its original steering matrix and generating a virtual receiver channel by using a modified steering matrix for the second radar unit that is in relation to the first radar unit.

(A8) In some embodiments of at least one of the methods of (A1)-(A7), generating combined beamforming information by summing the target information including the beamforming information from each radar unit comprises using angle compensation for target information indicating the target is a nearfield target.

(A9) In some embodiments of at least one of the methods of (A1)-(A8), transmitting from each radar unit the target information comprises determining a window area of interest and transmitting beamforming information for targets within the window area of interest.

(A10) In some embodiments of at least one of the methods of (A1)-(A9), transmitting from each radar unit the target information comprises: generating target information in the first radar unit in association with a first radar unit oscillator; and generating target information in the second radar unit in association with a second radar unit oscillator.

(B1) In another aspect, a method is described herein. The method includes providing a first radar unit, wherein the first radar unit is set as a master radar unit, and providing a second radar unit, wherein the second radar unit is a distance from the first radar unit. Each radar unit emitting radar signals and only processing returned radar signals emitted from itself. Moreover, each radar unit determining target information from its processed return radar signals; wherein this step includes generating a plurality of virtual receiver channels for each radar unit. The method also includes transmitting from each radar unit the target information including information from the virtual receiver channels to a central processing unit. Further, the method includes, in the central processing unit, generating beamforming information by using the information from the virtual receiver channels from each radar unit.

(B2) In some embodiments of the method of (B1), transmitting from each radar unit the target information including information from the virtual receiver channels comprises transmitting target range and doppler information.

(B3) In some embodiments of at least one of the methods of (B1)-(B2), transmitting from each radar unit the target information comprises: generating target information in the first radar unit in association with a first radar unit oscillator; and generating target information in the second radar unit in association with a second radar unit oscillator.

(B4) In some embodiments of at least one of the methods of (B1)-(B3), generating beamforming information by using the information from the virtual receiver channels from each radar unit comprises generating azimuth information for each target.

(C1) In another aspect, a radar system is described herein. The radar system includes at least first and second radar units. The first and second radar units separated by a distance. Each radar unit emitting radar signals and only processing returned radar signals emitted from itself. Further, each radar unit comprising target information having beamforming information. The radar system also includes a central processing unit in circuit communication with the radar units and comprising: logic for receiving from each radar unit the target information including the beamforming information; and logic for generating combined beamforming information by summing the target information including the beamforming information from each radar unit.

(C2) In some embodiments of the radar system of (C1), the first radar unit comprises a first oscillator for processing target information by the first radar unit and the second radar unit comprises a second oscillator for processing target information by the second radar unit.

(C3) In some embodiments of at least one of the radar systems of (C1)-(C2), the first and second radar units comprise MIMO radar units.

(C4) In some embodiments of at least one of the radar systems of (C1)-(C3), the target information comprises range and doppler information.

(C5) In some embodiments of at least one of the radar systems of (C1)-(C4), the logic for generating combined beamforming information by summing the target information including the beamforming information from each radar unit comprises logic for summing virtual receiver channel information from each radar unit.

(C6) In some embodiments of at least one of the radar systems of (C1)-(C5), further comprising logic for determining a window area of interest and only transmitting beamforming information for targets within the window area of interest.

What has been described above includes examples of one or more embodiments. It is, of course, not possible to describe every conceivable modification and alteration of the above devices or methodologies for purposes of describing the aforementioned aspects, but many further modifications and permutations of various aspects are possible and meant to be included within the disclosure herein. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method comprising:

providing a first radar unit, wherein the first radar unit is set as a master radar unit;

providing a second radar unit, wherein the second radar unit is at a distance from the first radar unit;

emitting first radar signals by the first radar unit and emitting second radar signals by the second radar unit, the first signals being not coherent with the second signals;

processing first return signals by the first radar unit, the first return signals being reflections of the first radar signals from a target, and processing second return signals by the second radar unit, the second return signals being reflections of the second radar signals from the target;

generating first target information based on the first radar signals by the first radar unit, wherein the generating includes beamforming the first radar unit using an original steering matrix to determine first beamforming information;

generating second target information based on the second radar signals by the second radar unit, wherein the generating includes beamforming the second radar unit using a modified steering matrix to determine second beamforming information, the modified steering matrix based on a virtual receiver channel of the second radar unit, the virtual receiver channel based on a position of the first radar unit relative to the target;

transmitting the first target information including the first beamforming information, and transmitting the second target information including the second beamforming information, to a central processing unit; and in the central processing unit, generating combined beamforming information by summing the first target information including the first beamforming information with the second target information including the second beamforming information to obtain a combined angle estimation for the target.

2. The method of claim 1 wherein transmitting the first target information and the second target information comprises transmitting azimuth information.

3. The method of claim 1 wherein transmitting the first target information and the second target information comprises transmitting azimuth and elevation information.

4. The method of claim 1 wherein the combined beamforming information has a higher resolution than a first resolution of the first beamforming information and a second resolution of the second beamforming information.

5. The method of claim 1 wherein generating the combined beamforming information generates a virtual radar aperture greater than the radar aperture of the first or second radar units.

6. The method of claim 1 wherein beamforming for the first radar unit and beamforming the second radar unit is one-dimensional or two-dimensional.

7. The method of claim 1 further comprising controlling a vehicle system based on the combined angle estimation.

8. The method of claim 1 wherein generating the combined beamforming information comprises using angle compensation for target information indicating the target is a nearfield target.

9. The method of claim 1 wherein transmitting the first target information and the second target information comprises determining a window area of interest, and transmitting the first target information and the second target information is based on the target being within the window area of interest.

10. The method of claim 1 wherein transmitting from each radar unit the first target information and the second target information comprises:

generating the first target information in the first radar unit in association with a first radar unit oscillator; and generating the second target information in the second radar unit in association with a second radar unit oscillator.

11. A method comprising:

providing a first radar unit, wherein the first radar unit is set as a master radar unit;

providing a second radar unit, wherein the second radar unit is at a distance from the first radar unit;

each radar unit emitting radar signals and only processing returned radar signals emitted from itself;

emitting first radar signals by the first radar unit and emitting second radar signals by the second radar unit, the first signals being not coherent with the second signals;

processing first return signals by the first radar unit, the first return signals being reflections of the first radar signals from a target, and processing second return signals by the second radar unit, the second return signals being reflections of the second radar signals from the target;

generating first target information based on the first radar signals by the first radar unit, wherein the generating includes beamforming the first radar unit using an original steering matrix to determine first beamforming information;

generating second target information based on the second radar signals by the second radar unit, wherein the generating includes beamforming the second radar unit using a modified steering matrix to determine second beamforming information, the modified steering matrix based on a virtual receiver channel of the second radar unit, the virtual receiver channel based on a position of the first radar unit relative to the target;

transmitting the first target information including the first beamforming information from the virtual receiver channel, and transmitting the second target information including the second beamforming information, to a central processing unit; and in the central processing unit, generating beamforming information by summing the first target information including the first beamforming information with the second target information including the second beamforming information to obtain a combined angle estimation for the target.

12. The method of claim 11 wherein transmitting the first target information and the second target information comprises transmitting target range and doppler information.

13. The method of claim 11 wherein transmitting from each radar unit the first target information and the second target information comprises:

generating the first target information in the first radar unit in association with a first radar unit oscillator; and generating the second target information in the second radar unit in association with a second radar unit oscillator.

14. The method of claim 11 wherein the combined beamforming information has a higher resolution than a first resolution of the first beamforming information and a second resolution of the second beamforming information.

15. A radar system comprising:

at least first and second radar units; the first and second radar units separated by a distance;

a central processing unit in circuit communication with the radar units and comprising logic for:

emitting first radar signals by the first radar unit and emitting second radar signals by the second radar unit, the first signals being not coherent with the second signals;

processing first return signals by the first radar unit, the first return signals being reflections of the first radar signals from a target, and processing second return signals by the second radar unit, the second return signals being reflections of the second radar signals from the target;

generating target information based on the first radar signals by the first radar unit, wherein the generating includes beamforming the first radar unit using an original steering matrix to determine first beamforming information;

generating target information based on the second radar signals by the second radar unit, wherein the generating includes beamforming the second radar unit using a modified steering matrix to determine second beamforming information, the modified steering matrix based on a virtual receiver channel of the second radar unit, the virtual receiver channel based on a position of the first radar unit relative to the target;

transmitting the first target information including the first beamforming information, and the second target information including the second beamforming information to a central processing unit; and in the central processing unit, generating combined beamforming information by summing the first target information including the first beamforming information with the second target information including the second beamforming information to obtain a combined angle estimation for the target.

16. The system of claim 15 wherein the first radar unit comprises a first oscillator for generating the first target information by the first radar unit and the second radar unit comprises a second oscillator for generating the second target information by the second radar unit.

17. The system of claim 15 wherein the first and second radar units comprise MIMO radar units.

18. The system of claim 15 wherein the first target information and the second target information comprises range and doppler information.

19. The system of claim 15 wherein the combined beamforming information has a higher resolution than a first resolution of the first beamforming information and a second resolution of the second beamforming information.

20. The system of claim 15 further comprising logic for determining a window area of interest and only transmitting the first target information and the second target information based on the target being within the window area of interest.

* * * * *